(12) United States Patent
Gundavelli et al.

(10) Patent No.: US 12,218,830 B2
(45) Date of Patent: Feb. 4, 2025

(54) USER EQUIPMENT ROUTE SELECTION POLICY FOR MULTI- LINK OPERATION OVER MULTIPLE RADIO ACCESS TECHNOLOGIES

(71) Applicant: Cisco Technology, Inc., San Jose, CA (US)

(72) Inventors: Sri Gundavelli, San Jose, CA (US); Indermeet Singh Gandhi, San Jose, CA (US); Arun G. Khanna, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 398 days.

(21) Appl. No.: 17/852,720

(22) Filed: Jun. 29, 2022

(65) Prior Publication Data
US 2024/0007395 A1    Jan. 4, 2024

(51) Int. Cl.
*H04W 40/12*    (2009.01)
*H04L 45/302*    (2022.01)

(52) U.S. Cl.
CPC ........... *H04L 45/306* (2013.01); *H04W 40/12* (2013.01)

(58) Field of Classification Search
CPC .......................... H04L 45/306; H04W 40/12
See application file for complete search history.

(56) References Cited

U.S. PATENT DOCUMENTS

| | | | | |
|---|---|---|---|---|
| 11,950,198 | B2 * | 4/2024 | Wang | H04W 76/16 |
| 2020/0154389 | A1 * | 5/2020 | Karampatsis | H04W 60/005 |
| 2020/0236727 | A1 * | 7/2020 | Salkintzis | H04W 48/18 |
| 2020/0259904 | A1 | 8/2020 | Dao et al. | |
| 2020/0359439 | A1 | 11/2020 | Qiao et al. | |
| 2021/0058784 | A1 * | 2/2021 | Kedalagudde | H04W 48/18 |
| 2021/0136672 | A1 * | 5/2021 | Jagannatha | H04W 48/18 |
| 2021/0243664 | A1 * | 8/2021 | Huang-Fu | H04W 76/11 |
| 2021/0400753 | A1 | 12/2021 | Salkintzis | |
| 2022/0264503 | A1 * | 8/2022 | Starsinic | H04W 8/20 |
| 2022/0360948 | A1 * | 11/2022 | Moon | H04L 41/0894 |
| 2022/0361080 | A1 * | 11/2022 | Soliman | H04W 40/02 |
| 2023/0128763 | A1 * | 4/2023 | Balmakhtar | H04L 45/306 370/389 |

(Continued)

FOREIGN PATENT DOCUMENTS

WO    2022048441    3/2022

*Primary Examiner* — Fahmida S Chowdhury
(74) *Attorney, Agent, or Firm* — Polsinelli P.C.

(57) ABSTRACT

The present disclosure is directed to a comprehensive Route Selection Policy (URSP) based on Wi-Fi multi-link operation. In one aspect, a method includes identifying a user device connected to an enterprise network that provides network connectivity to user devices over multiple radio access technologies; receiving network capability information indicating that the user device is capable of a multi-link operation over a Wi-Fi network, the Wi-Fi network being one of the multiple radio access technologies; determining a URSP for the user device, wherein the URSP is a singular route selection policy for the user device to send and receive data over the multiple radio access technologies and defines, in part, a per-application traffic routing rule for routing a portion of traffic for an application used on the user device, over one of multiple links available on the Wi-Fi network; and transmitting the URSP to the user device.

20 Claims, 10 Drawing Sheets

(56) References Cited

U.S. PATENT DOCUMENTS

| | | | |
|---|---|---|---|
| 2023/0239264 A1* | 7/2023 | Wang | H04L 51/216 |
| | | | 709/206 |
| 2023/0247094 A1* | 8/2023 | Wang | G06F 16/182 |
| | | | 709/217 |
| 2023/0269658 A1* | 8/2023 | Xue | H04W 48/18 |
| | | | 370/329 |
| 2023/0276339 A1* | 8/2023 | Chandramouli | H04W 40/246 |
| | | | 370/392 |
| 2023/0318982 A1* | 10/2023 | Mondet | H04L 47/2475 |
| | | | 370/230 |
| 2023/0370902 A1* | 11/2023 | Wang | H04W 28/0268 |
| 2023/0379764 A1* | 11/2023 | Zhu | H04W 28/24 |
| 2023/0422085 A1* | 12/2023 | Babbellapati | H04W 28/0268 |
| 2024/0097982 A1* | 3/2024 | Yang | H04W 40/02 |
| 2024/0137855 A1* | 4/2024 | Adjakple | H04W 76/12 |
| 2024/0276360 A1* | 8/2024 | Atarius | H04W 48/18 |

* cited by examiner

USER EQUIPMENT ROUTE SELECTION POLICY FOR MULTI- LINK OPERATION OVER MULTIPLE RADIO ACCESS TECHNOLOGIES

TECHNICAL FIELD

The subject matter of this disclosure relates in general to the field of computer networking, and more particularly, to defining a 3GPP UE Route Selection Policy (URSP) based on Wi-Fi multi-link operation so that a singular application policy can dictate how application traffic needs to be exchanged among multiple radio access technologies.

BACKGROUND

Current mobile and wireless communication systems have widely adopted a next-generation wireless communication system, 5G, or new radio (NR) that provides much higher data rates and lower latency. With the 5G evolution, a Private 5G (P5G) has been introduced, which uses 5G-enabled technologies, but allows the owner to provide priority access or licensing for its dedicated bandwidth. Furthermore, 5G will increasingly coexist with multiple radio access technologies such as Wi-Fi 6 and Wi-Fi 7.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1A:
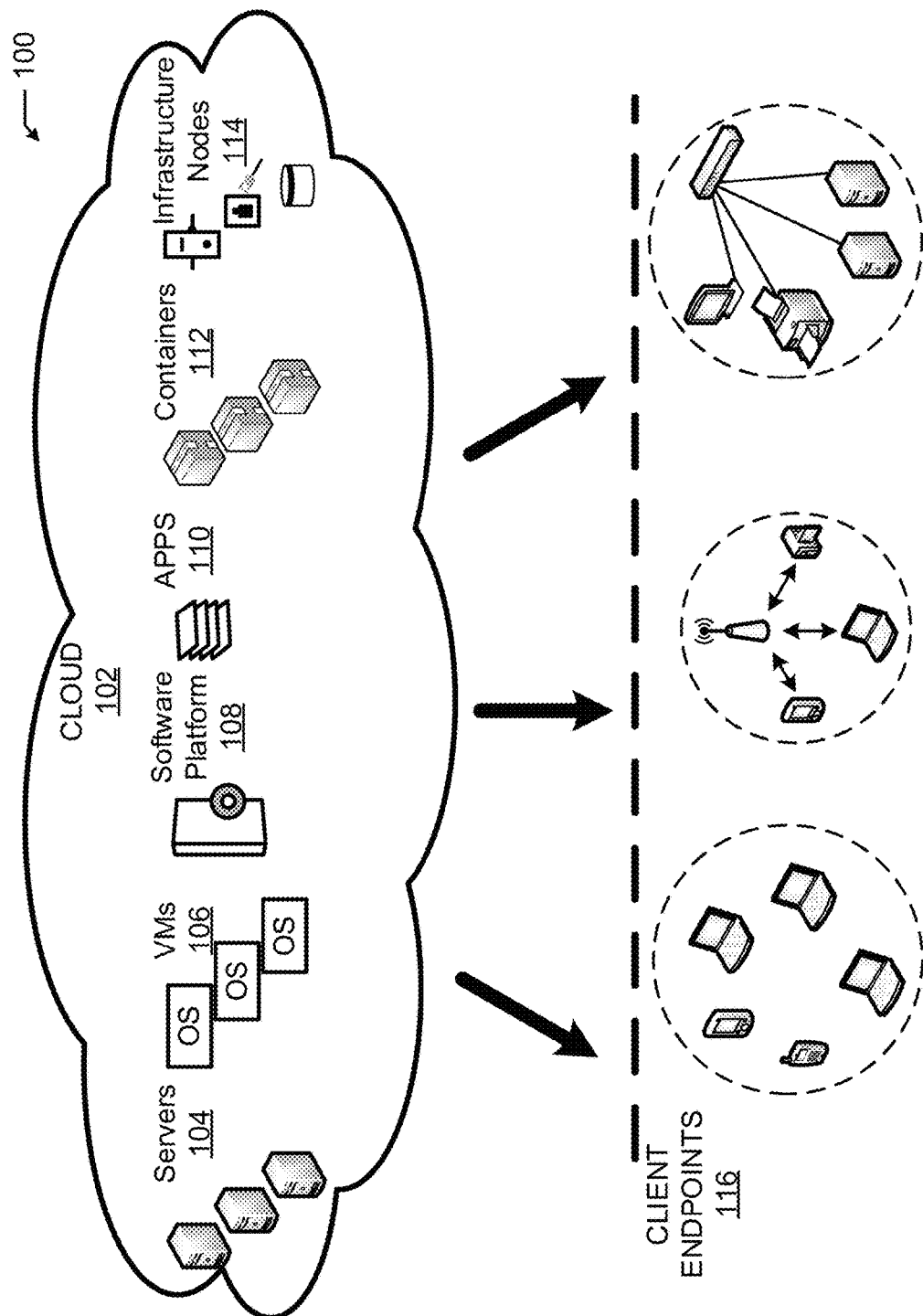
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Disclosed herein are systems, methods, and computer-readable media for defining a User Equipment Route Selection Policy (URSP), a uniform or converged URSP, based on Wi-Fi multi-link operation so that a singular application policy can dictate how application traffic needs to be exchanged among multiple radio access technologies such as 5G and Wi-Fi 6/Wi-Fi 7.

In one aspect, a method of defining a URSP based on Wi-Fi multi-link operation includes identifying a user device connected to an enterprise network, the enterprise network providing network connectivity to user devices over multiple radio access technologies; receiving network capability information indicating that the user device is capable of a multi-link operation over a Wi-Fi network, the Wi-Fi network being one of the multiple radio access technologies; determining a user equipment route selection policy (URSP) for the user device, wherein the URSP is a singular route selection policy for the user device to send and receive data over the multiple radio access technologies and defines, in part, a per-application traffic routing rule for routing a portion of traffic for an application used on the user device, over one of multiple links available on the Wi-Fi network; and transmitting the URSP to the user device.

In another aspect, the URSP is transmitted to the user device via a first access point associated with a cellular network or a second access point of the Wi-Fi network to which the user device is connected, the cellular network being another one of the multiple radio access technologies.

In another aspect, the URSP is transmitted to the user device in a Non-Access Stratum (NAS) message over the cellular network.

In another aspect, the URSP is transmitted to the user device in an Over-the-Air (OTA) steering of roaming (SOR) message over the cellular network.

In another aspect, the URSP defines the traffic routing rules to deactivate, in response to determining a termination of the application at the user device, at least one of the multiple links over which the portion of traffic is routed for the application.

In another aspect, the method further includes receiving performance data associated with the link; and updating the URSP based on the performance data.

In another aspect, the URSP is determined for each application available for use on the user device.

In one aspect, a network controller includes one or more memories having computer-readable instructions stored therein and one or more processors. The one or more processors are configured to execute the computer-readable instructions to identify a user device connected to an enterprise network, the enterprise network providing network connectivity to user devices over multiple radio access technologies; receive network capability information indicating that the user device is capable of a multi-link operation over a Wi-Fi network, the Wi-Fi network being one of the multiple radio access technologies; determine a user equipment route selection policy (URSP) for the user device, wherein the URSP is a singular route selection policy for the user device to send and receive data over the multiple radio access technologies and defines, in part, a per-application traffic routing rule for routing a portion of traffic for an application used on the user device, over one of multiple links available on the Wi-Fi network; and transmit the URSP to the user device.

In one aspect, one or more non-transitory computer-readable media include computer-readable instructions, which when executed by one or more processors of a network controller, cause the network controller to identify a user device connected to an enterprise network, the enterprise network providing network connectivity to user devices over multiple radio access technologies; receive network capability information indicating that the user device is capable of a multi-link operation over a Wi-Fi network, the Wi-Fi network being one of the multiple radio access technologies; determine a user equipment route selection policy (URSP) for the user device, wherein the URSP is a singular route selection policy for the user device to send and receive data over the multiple radio access technologies and defines, in part, a per-application traffic routing rule for routing a portion of traffic for an application used on the user device, over one of multiple links available on the Wi-Fi network; and transmit the URSP to the user device.

Description of Example Embodiments

As noted above, an enterprise network architecture has an option of providing connected UEs and end terminals access to the network using multiple radio access technologies (e.g., 3GPP access such as 4G/LTE/5G, etc., and non-3GPP access such as Wi-Fi 6, Wi-Fi 7, etc.). Further, as becomes more prevalent within enterprise architecture, having a singular policy for a converged network that can be delivered to an enterprise user can be valuable. In 4G/5G technologies, 3GPP-based UE Route Selection Policy (URSP) is used for application path selection. More specifically, a URSP includes information that maps certain user data traffic (i.e., applications) to 5G Protocol Data Unit (PDU) session connectivity parameters. For example, URSP can provide semantics for binding an application to the network elements identified in the architecture (i.e., binding an application to S-NSSAI/DNN/RAT Type).

At the same time, new non-3GPP access technologies such as Wi-Fi 7 uses a "multi-link operation." More specifically, a station (STA) can establish more than one link with the same or different access point (i.e., access point (AP) multi-link device (MLD)). For example, an AP MLD can send and receive data simultaneously over multiple frequency bands. As follows, a multi-link AP/non-AP logical entity can use multiple paths (e.g., a 5 GHz and a 6 GHz associations) for the user plane traffic.

However, the current structure of the URSP policy cannot bind applications to Wi-Fi links by characterizing the type of the non-3GPP access link in precise terms. The existing approach can determine whether to go on 3GPP access or non-3GPP access. No coherent mapping of application policies is available when the STA moves from one technology (e.g., P5G) to another (Wi-Fi 6/7) or when to enable the multi-link capability that is present in Wi-Fi access. Also, the existing approach is at the radio access technology (RAT) level, which is insufficient when there is a choice of Wi-Fi 6 or Wi-Fi 7 or when application traffic requires multipath enablement in the Wi-Fi domain.

Therefore, there exists a need for extending the URSP policy with policy elements identifying the nature of the Wi-Fi link to be used for the application binding. Further, there exists a need for allowing the use of URSP policy exchange over Wi-Fi link-layer protocols.

The present technology includes systems, methods, and computer-readable media for solving the foregoing problems and discrepancies, among others. As described in more detail below, the present disclosure provides systems, methods and computer-readable media for defining a comprehensive URSP based on Wi-Fi multi-link operation so that a singular application policy can dictate how application traffic needs to be exchanged among multiple radio access technologies. Further, the proposed solution can specify extensions to the URSP structure and rules at the user device for activation and/or deactivation of the Wi-Fi multi-link based on the elements in the URSP policy.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

The client endpoints 116 can communicate with the elements 104-114 as part of accessing network services through infrastructure intermediation messaging. Specifically, communications between the elements 104-114 and the client endpoints 116 can be managed and otherwise controlled through a network infrastructure between the client endpoints 116 and the cloud 102. For example, any of a 5G infrastructure, an LTE infrastructure and a Wi-Fi infrastructure can communicate a physical location of a client endpoint to a cloud service. In turn, the cloud service can cause the infrastructure to send specific signaling to the client endpoint for accessing network services through the cloud service. For example, the cloud service can use the LTE infrastructure, e.g. through an LTE S14 interface, to alert the client endpoint of Wi-Fi availability through the Wi-Fi infrastructure. In another example, the cloud service can use the Wi-Fi infrastructure, e.g. through MBO Wi-Fi messaging, to alert the client endpoint of LTE availability through the LTE infrastructure.

Figure 1B:
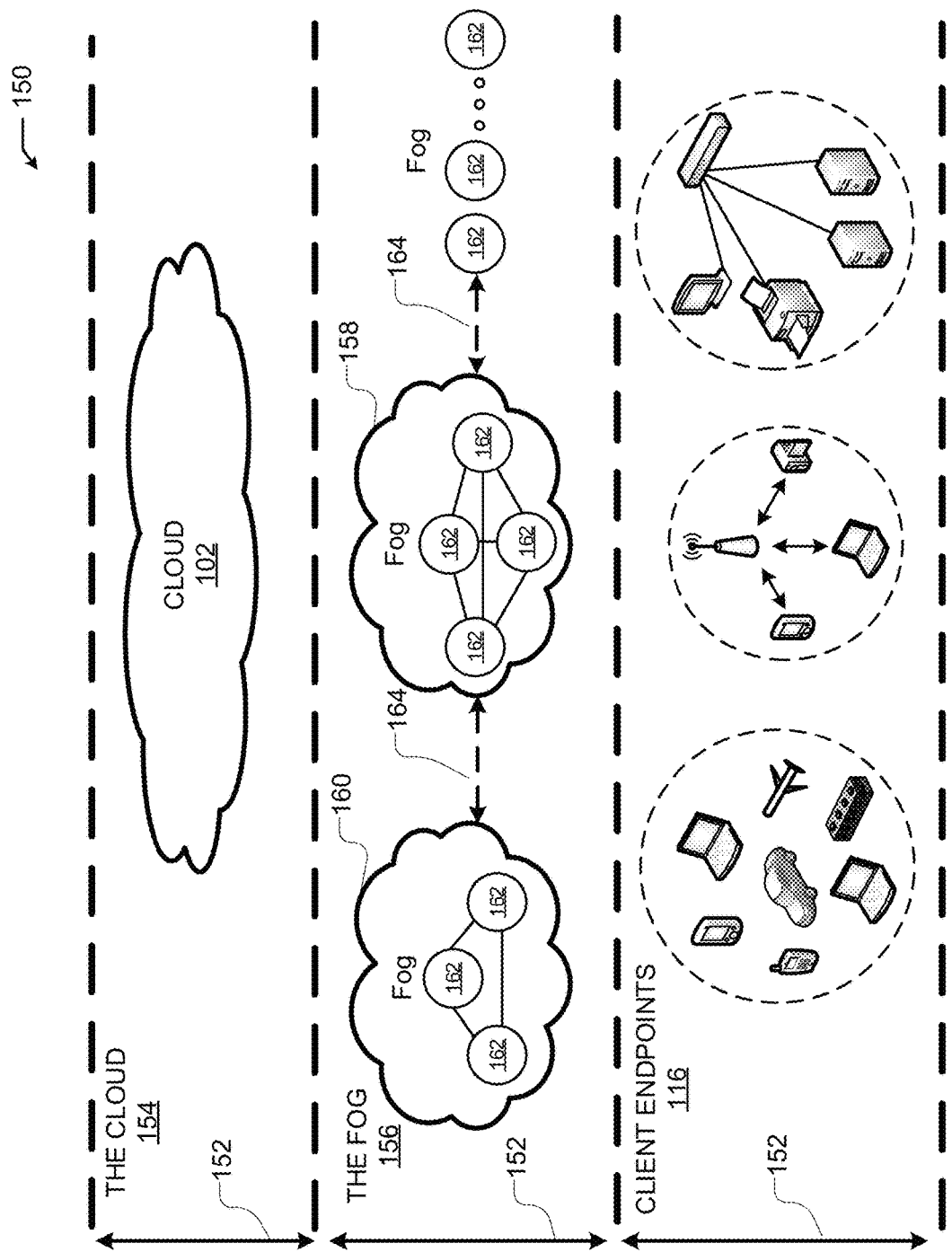
FIG. 1B illustrates an example fog computing architecture

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2:
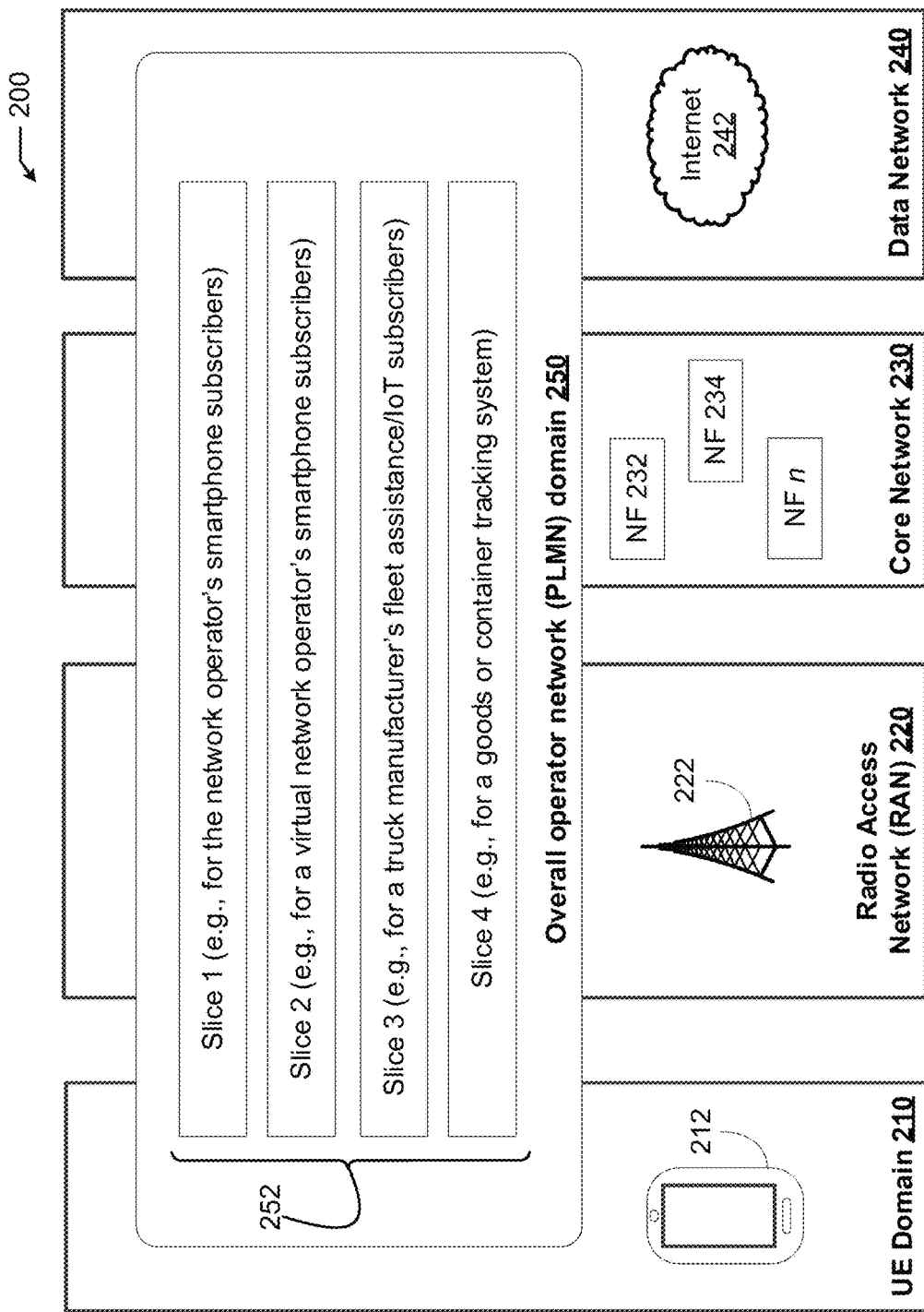
FIG. 2 depicts an exemplary schematic representation of a 5G network environment in which network slicing has been implemented, and in which one or more aspects of the present disclosure may operate.

FIG. 2 depicts an exemplary schematic representation of a 5G network environment 200 in which network slicing has been implemented, and in which one or more aspects of the present disclosure may operate. As illustrated, network environment 200 is divided into four domains, each of which will be explained in greater depth below; a User Equipment (UE) domain 210, e.g. of one or more enterprise, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, . . . , n reside; and a Data Network 240, in which one or more data communication networks such as the Internet 242 reside. Additionally, the Data Network 240 can support SaaS providers configured to provide SaaSs to enterprises, e.g. to users in the UE domain 210.

Core Network 230 contains a plurality of Network Functions (NFs), shown here as NF 232, NF 234 . . . NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically executes in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator network domain 250 is defined. The operator network domain 250 is in some embodiments a Public Land Mobile Network (PLMN), and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the RAN 220, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

Figure 3:
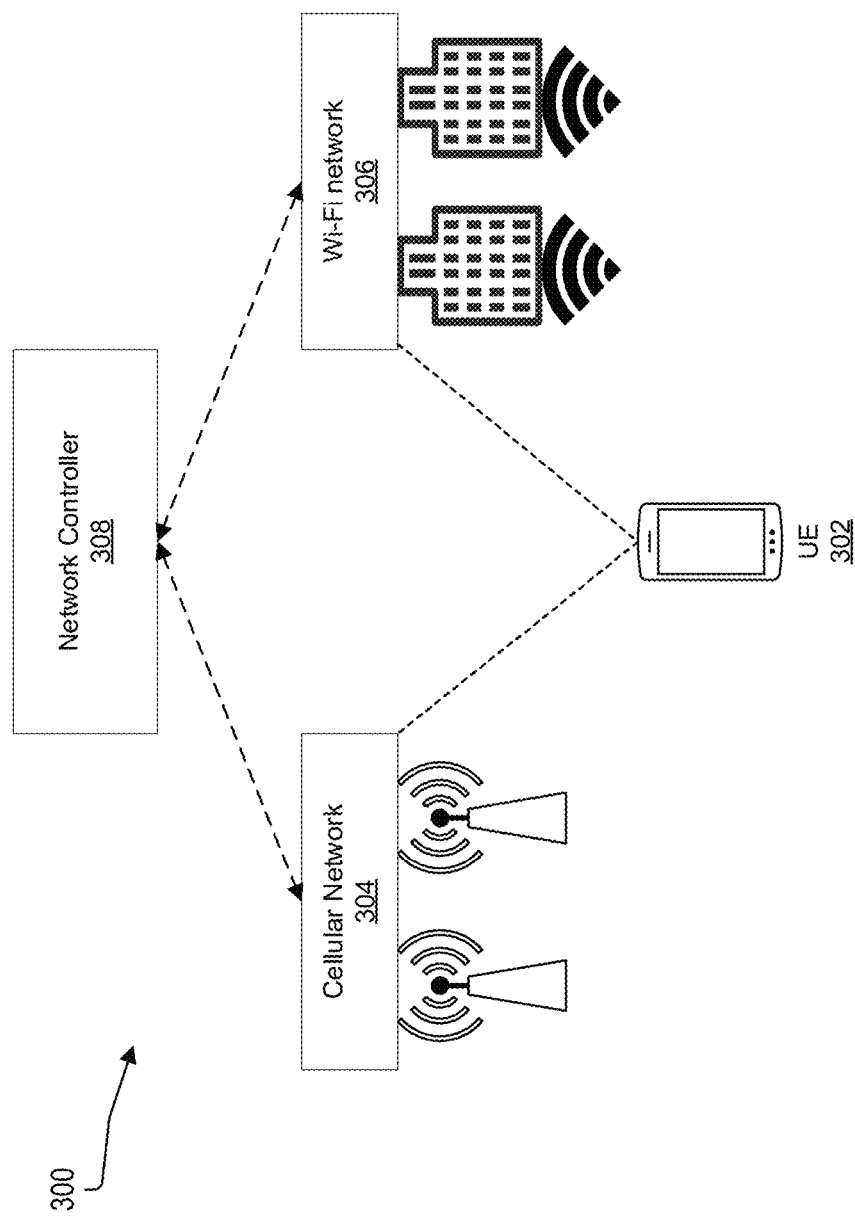
FIG. 3 illustrates an example network environment according to some aspects of the present disclosure.

FIG. 3 illustrates an example network environment 300 according to some aspects of the present disclosure. Example network environment 300 comprises UE 302, cellular network 304, Wi-Fi network 306, and network controller 308. Network controller 308 can be a cloud-based controller of the overall enterprise network such as the enterprise network of FIGS. 1 and 2 (may also be referred to as a Digital Network Architecture Controller (DNAC)). Cellular network 304 and Wi-Fi network 306 may provide multiple access technologies for a single or multiple different enterprise networks. While FIG. 3 illustrates just one example UE 302, network environment 300 can include more than one UE 302. Similarly, while a single cellular network and Wi-Fi network that may be forming a private enterprise network are shown in FIG. 3, network environment 300 can also include any number of enterprise (private) or public networks with multiple access technologies.

According to some examples, UE 302 has the capability to connect to the 5G network and Wi-Fi 7. In particular, when UE 302 attaches to cellular network 304 (e.g., 5G network), UE 302 can exchange its Wi-Fi capability to cellular network 304 to obtain identical service on both cellular network 304 and Wi-Fi network 306.

In some instances, network controller 308 can determine a URSP application policy per UE. The URSP application policy can define how application traffic is exchanged over a 5G link. Further, the URSP application policy can cover Wi-Fi access, more specifically Wi-Fi multi-link. Examples of URSP policies can include routing protocols regarding applications over P5G, applications over Wi-Fi links (e.g., single path application and multi-path application), multi-path links setup and termination rules, and multi-path links redundant traffic rules.

In some examples, network controller 308 can deliver the URSP application (e.g., on a per UE capability basis) to UE 302 over 5G or Wi-Fi access (e.g., AP of cellular network 304 or AP of Wi-Fi network 306).

Table 1 shows an example URSP application policy for UE 302.

TABLE 1

| App-ID | Single Path | | Multi-Path | | |
|---|---|---|---|---|---|
| | Preferred Link | Secondary Link | Link-1 | Link-2 | Redundant Traffic on Multi-Path |
| App A | 6 Ghz | 5 Ghz | — | — | — |
| App B | 5 Ghz | 6 Ghz | — | — | — |
| App C | 2.4 Ghz | 5 Ghz | — | — | — |
| App D | — | — | 6 Ghz | 5 Ghz | Y |
| App E | — | — | 6 Ghz | 5 Ghz | Y |
| App F | 5 Ghz | 6 Ghz | — | — | — |

As shown in Table 1, some applications (e.g., App D and App E) need multi-links for redundant transmission or splitting of certain traffic across multi-links. Examples of such applications include, but are not limited to, time-sensitive network application (TSN), drone applications, Unmanned Arial Vehicle (UAV) applications, etc. On the other hand, other applications (e.g., App A, App B, App C, and App F) can be tied to a single link with a preference for the band. Examples of such applications include, but are not limited to, WebEx developed and operated by Cisco Technologies, Inc. of San Jose, CA, Sidewalk, etc. In some examples, an enterprise may separate App A from App B for business reasons or separate an IoT application from non-IoT applications, which can be reflected in the URSP policy. More specifically, the URSP policy can be dynamically updated for each UE.

According to some examples, when UE 302 is in coverage of Wi-Fi network 306, UE 302 can establish an association with single or multi-links of Wi-Fi network 306 per URSP application policy. As follows, application traffic can be exchanged per URSP policy on different links (e.g., a single path of 6 Ghz/5 Ghz or multi-path). Further, a set-up and/or termination of a link can be done through an application start/stop trigger. Also, redundant link setup and traffic can flow through the application start/stop trigger.

Figure 4A:
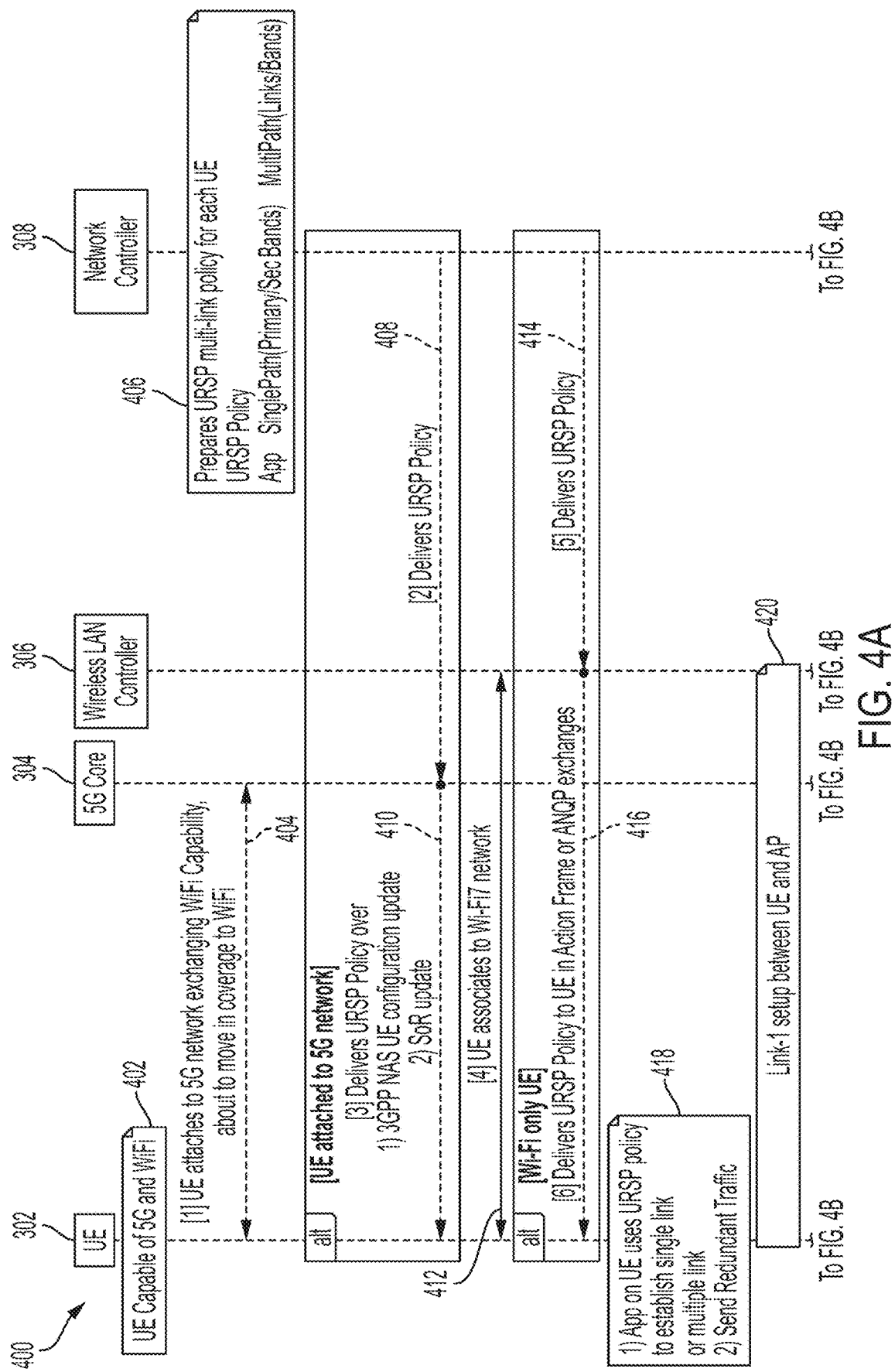
FIGS. 4A-4C illustrate an example flow of the URSP creation process based on Wi-Fi multi-link operation, according to some aspects of the present disclosure.
Figure 4B:
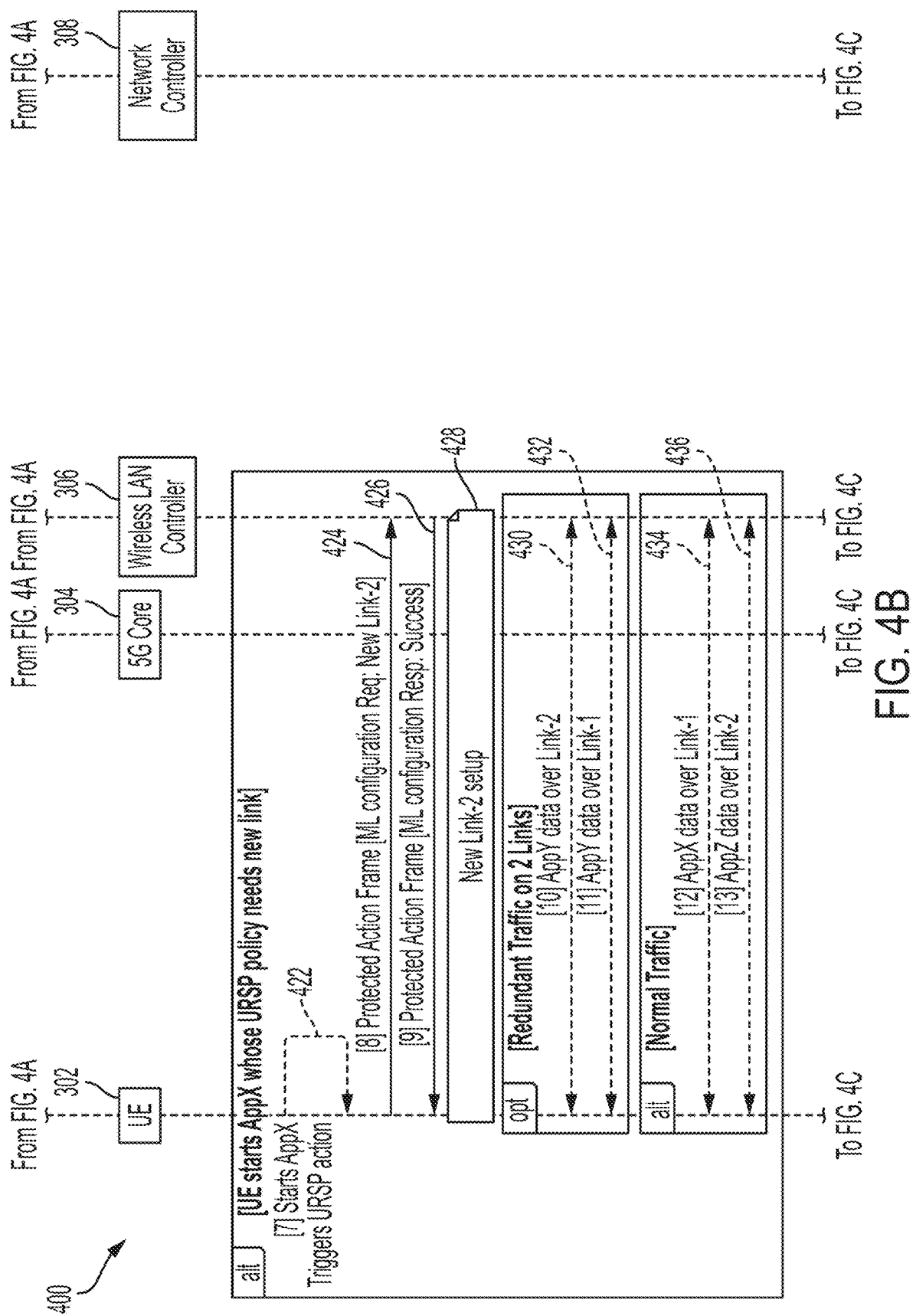
Figure 4C:
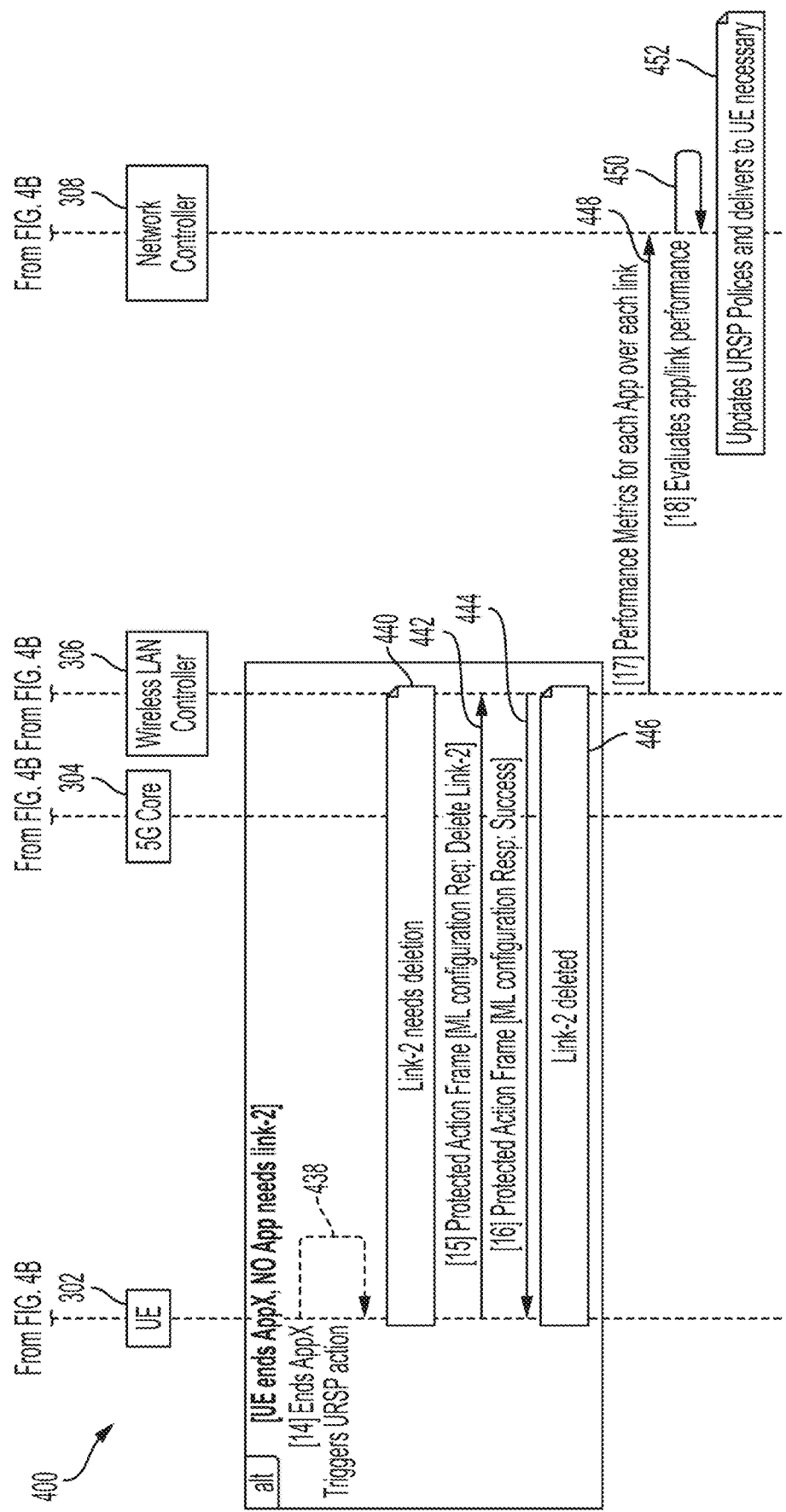

FIGS. 4A-4C illustrates an example flow 400 of the URSP creation process based on Wi-Fi multi-link operation, according to some aspects of the present disclosure. Network environment for example flow 400 of the URSP creation process comprises UE 302, 5G core network 304, wireless LAN controller 306, and network controller 308.

At step 402, UE 302 is capable of connecting to both 5G and Wi-Fi (e.g., Wi-Fi 7). At step 404, UE 302 attaches to 5G network and shares its capability information with 5G core network 304. At step 406, network controller 308 can determine a URSP for UE 302.

In some examples, when UE 302 is attached to 5G network, at step 408, network controller 308 can deliver the URSP policy to 5G core network 304, which then forwards the URSP policy to UE 302 at step 410. 5G core network 304 can deliver the URSP policy to UE 302 over 3GPP NAS signaling (e.g., UE configuration update). Also, 5G core network 304 can deliver the URSP policy to UE 302 as a Steering Of Roaming (SOR) message. Thus, at step 412, UE 302 associates to Wi-Fi network 306 (e.g., Wi-Fi 7 network).

In some instances and for UEs with only Wi-Fi access capability, the URSP policies may be delivered to such UEs over Wi-Fi signaling. More specifically and as shown at steps 414 and 416, network controller 308 can deliver the URSP policy to wireless LAN controller 306 at step 414, which then delivers the URSP policy to UE 302 in Action Frame or Access Network Query Protocol (ANQP) exchanges at step 416.

According to some examples, at step 418, an application on UE 302 uses the URSP policy to establish a single link or multiple links, which in some instances, may send redundant traffic. As follows, at step 420, primary Link-1 is set up between UE 302 and an AP of 5G core network 304 and/or wireless LAN controller 306. Applications on UE 302 and the URSP policy can determine whether UE 302 establishes a single link or multiple links during the association.

FIG. 4B is a continuous diagram of FIG. 4A. In particular, FIG. 4B illustrates the process of setting up a new link, for example, triggered by a new application. At step 422, UE 302 starts App X, which would trigger a URSP action. For example, UE 302 can start a new application whose URSP policy needs a redundant link. At step 424, UE 302 can exchange Protected Action Frame on primary Link-1 to trigger an ML configuration for the establishment of a new link with wireless LAN controller 306 (e.g., with a redundant link marker). At step 426, wireless LAN controller 306 can acknowledge the success and send an ML configuration response to UE 302. As follows, at step 428, a new Link-2 is set up between UE 302 and wireless LAN controller 306 (i.e., wireless network), and therefore, traffic flow can be established over existing Link-1 and new Link-2.

In some examples, for redundant traffic on both links, at step 430, a portion of App Y data can be sent over Link-2 while another portion of App Y data can be sent over Link-1 at step 432.

In some instances, App X data can be sent over Link-1 at step 434 while App Z data can be sent over Link-2 at step 436.

FIG. 4C is a continuous diagram of FIG. 4B. In particular, FIG. 4C illustrates the termination process of the new link, for example, triggered by an application closure. At step 438, UE 302 ends App X whose data traffic was sent over Link-2. As follows, at step 440, the closure of Link-2 is triggered. At step 442, UE 302 can exchange Protected Action Frame on primary Link-1 to trigger ML configuration deletion of Link-2 with wireless LAN controller 306 (e.g., with a deletion marker). At step 444, wireless LAN controller 306 can acknowledge the success and send an ML configuration success response to UE 302. Thus, Link-2 between UE 302 and wireless LAN controller 306 is terminated at step 446.

Further, at step 448, wireless LAN controller 306 can provide performance metrics for each App over each link to network controller 308. Network controller 308 can evaluate app/link performance based on the performance metrics at step 450. As a result, at step 452, network controller 308 can update URSP policies and deliver the updated URSP policies to UE 302, if necessary.

Figure 5:
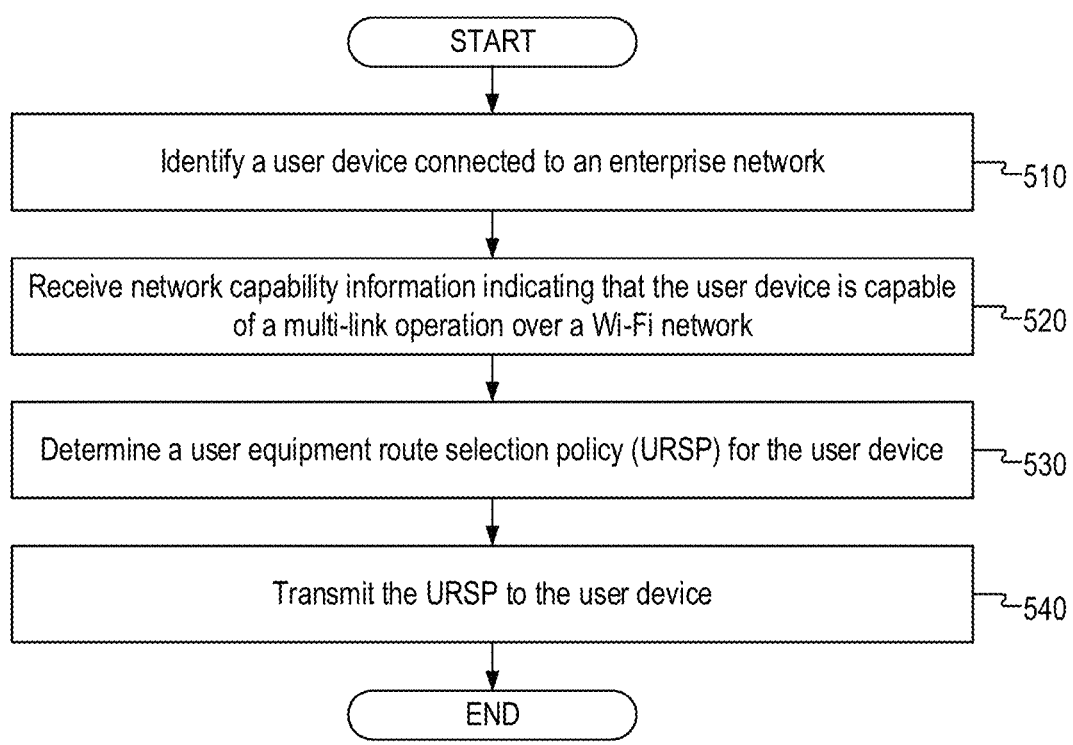
FIG. 5 illustrates a flow chart for defining a URSP based on Wi-Fi multi-link operation, according to some aspects of the present disclosure.

FIG. 5 illustrates a flow chart for an example method 500 of defining a URSP based on Wi-Fi multi-link operation, according to some aspects of the present disclosure. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

At step 510, method 500 includes identifying a user device connected to an enterprise network that can provide network connectivity to user devices over multiple radio access technologies. For example, network controller 308 as illustrated in FIGS. 3 and 4 can identify UE 302 connected to cellular network 304 (or 5G network). Also, cellular network 304 can provide network connectivity to UE 302 over multiple radio access technologies.

At step 520, method 500 includes receiving network capability information indicating that the user device is capable of a multi-link operation over a Wi-Fi network, the Wi-Fi network being one of the multiple radio access technologies. For example, network controller 308 as illustrated in FIGS. 3 and 4 can receive, as part of initial attachment request by UE 302 for connecting to network 304, network capability information indicating that UE 302 is capable of a multi-link operation over Wi-Fi network 306. Also, Wi-Fi network 306 is one of the multiple radio access technologies.

At step 530, method 500 includes determining a user equipment route selection policy (URSP) for the user device. The URSP is a singular route selection policy for the user device over the multiple radio access technologies. Such URSP may define, in part, a per-application traffic routing rule for routing a portion of traffic for an application used on the user device, over one of the multiple links available on the Wi-Fi network, while another portion of the traffic is transmitted over another of the multiple links. In another instance, the entire traffic may be transmitted over each of the multiple links available on the Wi-Fi network.

In some examples, URSP may be determined based on parameters and specifications provided by a network operator and according to enterprise policies. For example, depending on a type of business that an enterprise network is used for, some applications may be more sensitive and hence require higher security and redundancy than others. An example of such application can be a drone control application or a UAV application for a manufacturer or operator of drones and UAVs. In another instance, an online streaming service may require redundancy for its streaming services to ensure no disruption in its services and hence may require transmission of data over multiple links when its streaming service application is used.

In some examples, the URSP is determined for each application of the user device. For example, network controller 308 as illustrated in FIGS. 3 and 4 can determine the URSP for each application of UE 302.

For example, network controller 308 as illustrated in FIGS. 3 and 4 can determine a URSP for UE 302. The URSP can be a singular route selection policy for UE 302 over multiple radio access technologies, which can include, for example, LTE, 5G, Wi-Fi 6, and Wi-Fi 7. Further, the URSP can define, in part, a per-application traffic routing rule for routing a portion of traffic for an application used on UE 302, over one of the multiple links available on Wi-Fi network 306.

In some examples, the URSP defines the traffic routing rules to deactivate, in response to determining the termination of the application at the user device, the link in which the portion of the traffic was routed for the application that requires redundant traffic. For example, network controller 308 as illustrated in FIGS. 3 and 4 can determine the URSP to define the traffic routing rules to deactivate, in response to determining the termination of the application at UE 302, the link in which the portion of the traffic was routed for the application that requires redundant traffic.

At step 540, method 500 includes transmitting the URSP to the user device. For example, network controller 308 as illustrated in FIGS. 3 and 4 can transmit the URSP to UE 302.

According to some examples, the URSP is transmitted to the user device via a first access point associated with a cellular network or a second access point of the Wi-Fi network to which the user device is connected, the cellular network being another one of the multiple radio access technologies. For example, network controller 308 as illustrated in FIGS. 3 and 4 can transmit the URSP to UE 302 via a first AP associated with cellular network 304 or a second AP of Wi-Fi network 306 to which UE 302 is connected.

In some examples, the URSP is transmitted to the user device in a Non-Access Stratum (NAS) message over a cellular network corresponding to one of the multiple radio access technologies. For example, network controller 308 as illustrated in FIGS. 3 and 4 can transmit the URSP to UE 302 in a NAS message over cellular network 304 (i.e., over 5G NAS signaling or 3GPP NAS UE configuration update).

In some instances, the URSP is transmitted to the user device in an Over-the-Air (OTA) steering of roaming (SOR) message over the cellular network. For example, network controller 308 as illustrated in FIGS. 3 and 4 can transmit the URSP to UE 302 in an OTA SOR message over cellular network 304.

In some examples, for a user device that only has Wi-Fi access capability, the URSP that provides an application-to-link mapping can be delivered to the user device over Wi-Fi signaling.

Further, Action Frames or ANQP messages can be used to deliver enterprise-specific URSP policies to a user device. As follows, enterprises can have control over how applications on a user device can access the enterprise Wi-Fi network.

In some instances, the URSP can signal a user device regarding which application needs to be sent as redundant traffic to the enterprise Wi-Fi network.

According to some implementations, method 500 includes receiving performance data associated with the link. For example, network controller 308 as illustrated in FIGS. 3 and 4 can receive performance data associated with the link(s) over which a UE sends and receives data according to a set URSP. The performance data can include, for example, jitter, delay, packet loss, channel utilization, etc.

Further, method 500 includes updating the URSP based on the performance data. For example, network controller 308 as illustrated in FIGS. 3 and 4 can update the URSP based on the performance data associated with the link. The updated URSP can include moving some applications from one link to another link (e.g., from 5 Ghz to 6 Ghz) or vice versa or enabling multi-links.

The URSP creation process of the present disclosure has the advantage of allowing enterprise network architecture to define a singular application policy to dictate how application traffic needs to be exchanged between the client and the network with various radio access technologies. Further, the multi-link operation in a Wi-Fi domain can be based on the URSP policy, which can be delivered by the enterprise policy function. As follows, the present disclosure can allow a converged network on a singular policy that the enterprise network can push to Wi-Fi/P5G UE.

Figure 6:
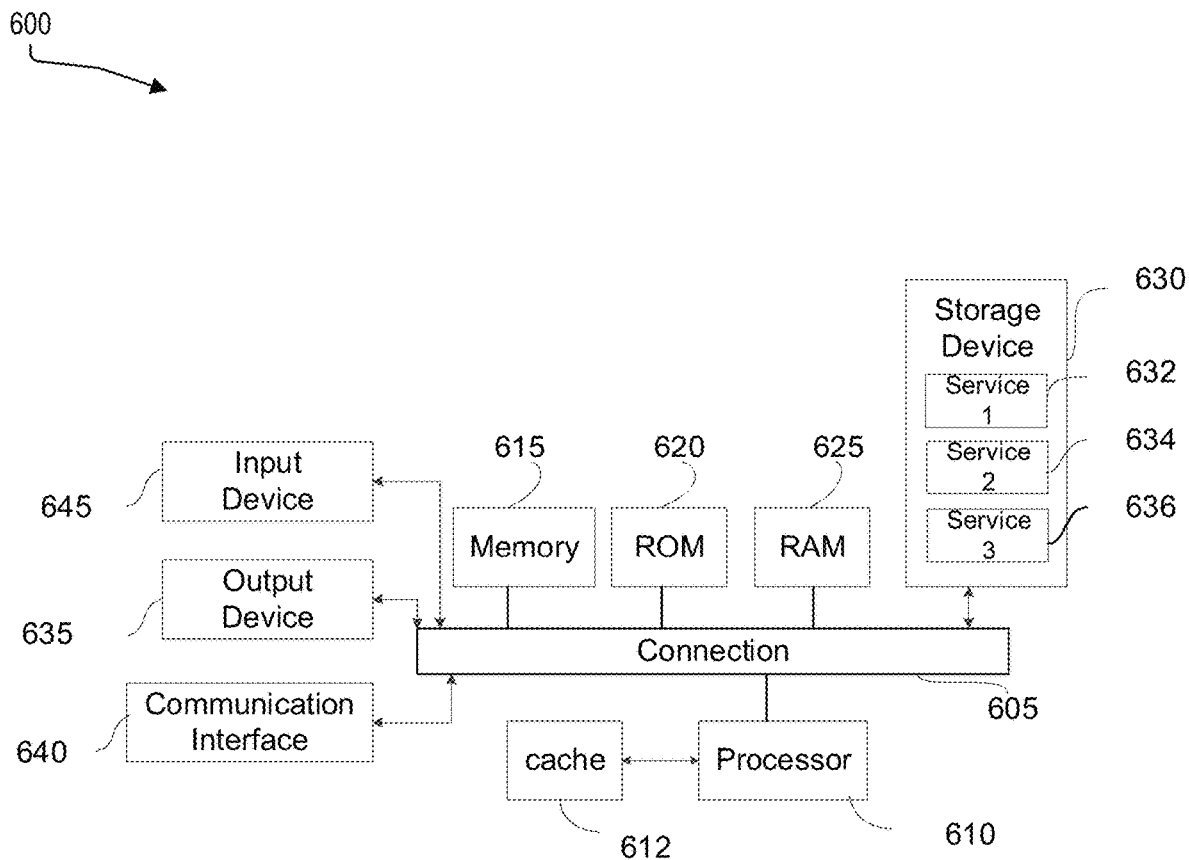
FIG. 6 shows an example computing system, which can be for example any computing device that can implement components of the system.
Figure 7:
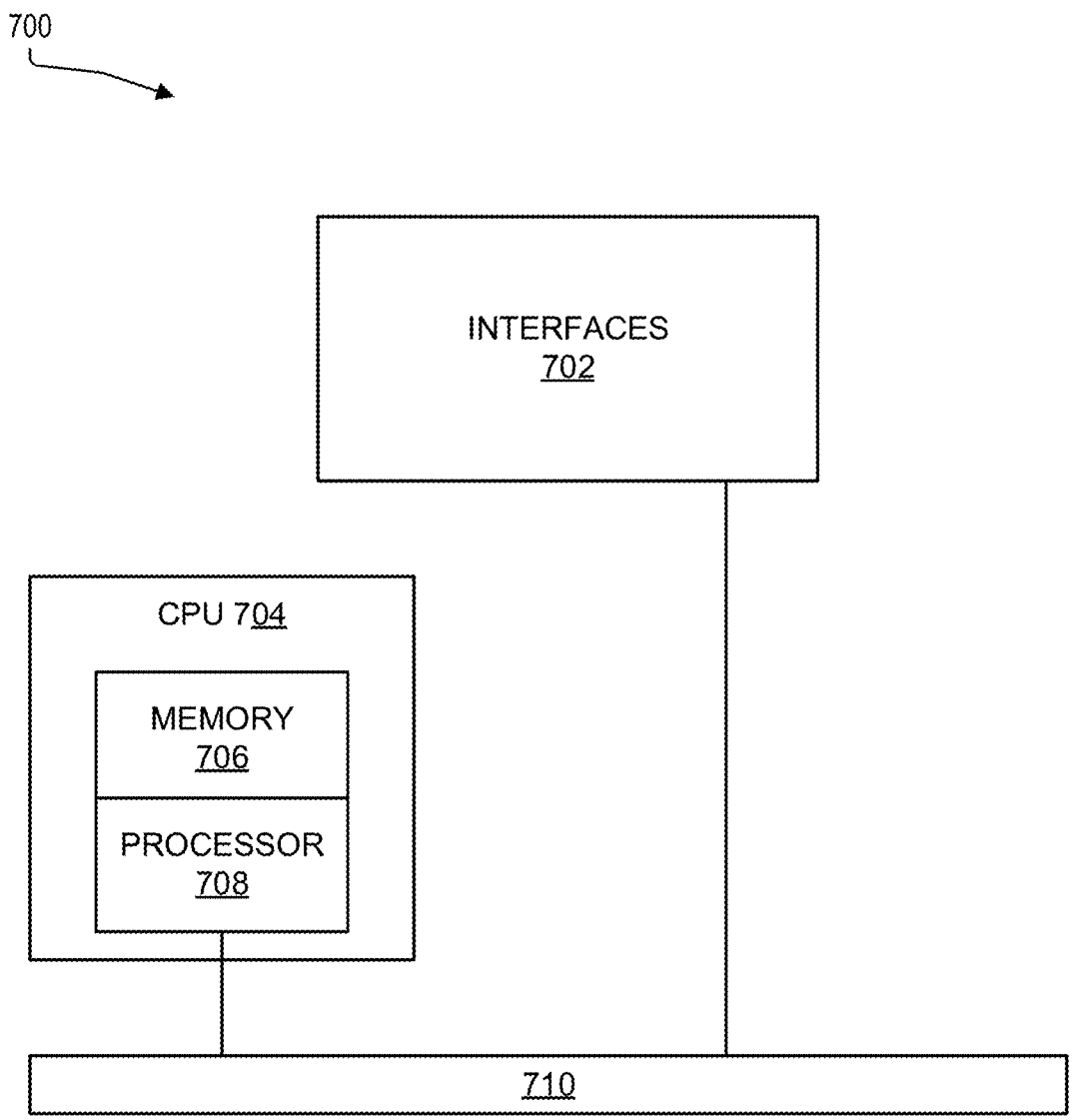
FIG. 7 illustrates an example network device, according to some aspects of the present disclosure.

Following disclosure with respect to FIGS. 6 and 7 illustrates example network devices and computing devices, such as switches, routers, load balancers, client devices, and so forth. Such example network and computing devices may be used to implement various components described above with reference to FIGS. 1-5 including, but not limited to, network controller 308.

FIG. 6 illustrates an example computing system 600 including components in electrical communication with each other using a connection 605 upon which one or more aspects of the present disclosure can be implemented. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

FIG. 7 illustrates an example of a network device 700 (e.g., switch, router, network appliance, etc.) suitable for performing switching, routing, load balancing, and other networking operations. The network device 700 can include a master central processing unit (CPU) 704, interfaces 702, and a bus 710 (e.g., a PCI bus). When acting under the control of appropriate software or firmware, the CPU 704 can be responsible for executing packet management, error detection, and/or routing functions. The CPU 704 preferably accomplishes all these functions under the control of software including an operating system and any appropriate applications software. The CPU 704 may include one or more processors 708 such as a processor from the Motorola family of microprocessors or the MIPS family of microprocessors. In an alternative embodiment, the processor 708 can be specially designed hardware for controlling the operations of the network device 700. In an embodiment, a memory 706 (such as non-volatile RAM and/or ROM) can also form part of the CPU 704. However, there are many different ways in which memory could be coupled to the system.

The interfaces 702 can be provided as interface cards (sometimes referred to as line cards). The interfaces 702 can control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 702 may include ports appropriate for communication with the appropriate media. In some cases, the interfaces 702 may also include an independent processor and, in some instances, volatile RAM. The independent processors may control communication intensive tasks such as packet switching, media control, and management. By providing separate processors for the communication intensive tasks, the interfaces 702 may allow the CPU 704 to efficiently perform routing computations, network diagnostics, security functions, and so forth.

Although the system shown in FIG. 7 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 700.

Regardless of the network device's configuration, it may employ one or more memories or memory modules (including the memory 706) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
   identifying a user device connected to an enterprise network, the enterprise network providing network connectivity to user devices over multiple radio access technologies;
   receiving network capability information indicating that the user device is capable of a multi-link operation over a Wi-Fi network, the Wi-Fi network being one of the multiple radio access technologies;
   determining a user equipment route selection policy (URSP) for the user device, wherein the URSP is a singular route selection policy for the user device to send and receive data over the multiple radio access technologies and defines, in part, a per-application traffic routing rule for routing a portion of traffic for an application used on the user device, over one of multiple links available on the Wi-Fi network; and
   transmitting the URSP to the user device.

2. The method of claim 1, wherein the URSP is transmitted to the user device via a first access point associated with a cellular network or a second access point of the Wi-Fi network to which the user device is connected, the cellular network being another one of the multiple radio access technologies.

3. The method of claim 2, wherein the URSP is transmitted to the user device in a Non-Access Stratum (NAS) message over the cellular network.

4. The method of claim 2, wherein the URSP is transmitted to the user device in an Over-the-Air (OTA) steering of roaming (SOR) message over the cellular network.

5. The method of claim 1, wherein the URSP defines the traffic routing rules to deactivate, in response to determining a termination of the application at the user device, at least one of the multiple links over which the portion of traffic is routed for the application.

6. The method of claim 1, further comprising:
receiving performance data associated with the link; and
updating the URSP based on the performance data.

7. The method of claim 1, wherein the URSP is determined for each application available for use on the user device.

8. A network controller comprising:
one or more memories having computer-readable instructions stored therein; and
one or more processors configured to execute the computer-readable instructions to:
identify a user device connected to an enterprise network, the enterprise network providing network connectivity to user devices over multiple radio access technologies;
receive network capability information indicating that the user device is capable of a multi-link operation over a Wi-Fi network, the Wi-Fi network being one of the multiple radio access technologies;
determine a user equipment route selection policy (URSP) for the user device, wherein the URSP is a singular route selection policy for the user device to send and receive data over the multiple radio access technologies and defines, in part, a per-application traffic routing rule for routing a portion of traffic for an application used on the user device, over one of multiple links available on the Wi-Fi network; and
transmit the URSP to the user device.

9. The network controller of claim 8, wherein the URSP is transmitted to the user device via a first access point associated with a cellular network or a second access point of the Wi-Fi network to which the user device is connected, the cellular network being another one of the multiple radio access technologies.

10. The network controller of claim 9, wherein the URSP is transmitted to the user device in a Non-Access Stratum (NAS) message over the cellular network.

11. The network controller of claim 9, wherein the URSP is transmitted to the user device in an Over-the-Air (OTA) steering of roaming (SOR) message over the cellular network.

12. The network controller of claim 8, wherein the URSP defines the traffic routing rules to deactivate, in response to determining a termination of the application at the user device, the link in which the portion of traffic was routed for the application that requires redundant traffic.

13. The network controller of claim 8, wherein the one or more processors are configured to execute the computer-readable instructions to:
receive performance data associated with the link; and
update the URSP based on the performance data.

14. The system of claim 8, wherein the URSP is determined for each application available for use on the user device.

15. One or more non-transitory computer-readable media comprising computer-readable instructions, which when executed by one or more processors of a network controller, cause the network controller to:
identify a user device connected to an enterprise network, the enterprise network providing network connectivity to user devices over multiple radio access technologies;
receive network capability information indicating that the user device is capable of a multi-link operation over a Wi-Fi network, the Wi-Fi network being one of the multiple radio access technologies;
determine a user equipment route selection policy (URSP) for the user device, wherein the URSP is a singular route selection policy for the user device to send and receive data over the multiple radio access technologies and defines, in part, a per-application traffic routing rule for routing a portion of traffic for an application used on the user device, over one of multiple links available on the Wi-Fi network; and
transmit the URSP to the user device.

16. The one or more non-transitory computer-readable media of claim 15, wherein the URSP is transmitted to the user device via a first access point associated with a cellular network or a second access point of the Wi-Fi network to which the user device is connected, the cellular network being another one of the multiple radio access technologies.

17. The one or more non-transitory computer-readable media of claim 16, wherein the URSP is transmitted to the user device in a Non-Access Stratum (NAS) message over the cellular network.

18. The one or more non-transitory computer-readable media of claim 16, wherein the URSP is transmitted to the user device in an Over-the-Air (OTA) steering of roaming (SOR) message over the cellular network.

19. The one or more non-transitory computer-readable media of claim 15, wherein the URSP defines the traffic routing rules to deactivate, in response to determining a termination of the application at the user device, at least one of the multiple links over which the portion of traffic is routed for the application.

20. The one or more non-transitory computer-readable media of claim 15, wherein the execution of the computer-readable instructions by the one or more processors, further cause the network controller to:
receive performance data associated with the link; and
update the URSP based on the performance data.

* * * * *